United States Patent
Fedders et al.

(10) Patent No.: US 6,986,413 B2
(45) Date of Patent: Jan. 17, 2006

(54) DETERMINING THE COIL TEMPERATURE OF A MAGNETORHEOLOGICAL DAMPER OF A VEHICLE

(75) Inventors: Brandon J. Fedders, Dayton, OH (US); Roy Mwangi, Huber Heights, OH (US); David C Tsui, Centerville, OH (US); David Andrew Shal, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/741,515

(22) Filed: Dec. 19, 2003

(65) Prior Publication Data

US 2005/0133318 A1 Jun. 23, 2005

(51) Int. Cl.
*F16F 9/53* (2006.01)
(52) U.S. Cl. .................................... 188/267.2
(58) Field of Classification Search ............... 188/266, 188/267.2; 267/140.14, 140.15
See application file for complete search history.

(56) References Cited

U.S. PATENT DOCUMENTS

| 4,629,967 | A | * | 12/1986 | Voss | 322/28 |
| 5,788,028 | A |   | 8/1998 | Bieber | |
| 6,343,677 | B2 | * | 2/2002 | Bell | 188/315 |

* cited by examiner

*Primary Examiner*—Christopher P. Schwartz
(74) *Attorney, Agent, or Firm*—Michael D. Smith

(57) ABSTRACT

Method for determining a present coil temperature of a coil of a magnetorheological (MR) damper of an operating automotive vehicle, wherein the coil is powered by an output of a controller connected to the coil through a conductor. One step includes calculating a coil-plus-conductor resistance from the voltage and the current of the output of the controller when the controller applies a test current to the coil and the conductor. Another step includes calculating the present coil temperature using at least the coil-plus-conductor resistance and compensating for the resistance of the conductor.

35 Claims, 1 Drawing Sheet

US 6,986,413 B2

DETERMINING THE COIL TEMPERATURE OF A MAGNETORHEOLOGICAL DAMPER OF A VEHICLE

TECHNICAL FIELD

The present invention relates generally to a magnetorheological (MR) damper of an operating automotive vehicle, and more particularly to a method for determining the coil temperature of such a damper.

BACKGROUND OF THE INVENTION

Conventional piston dampers include MR dampers having a cylinder containing an MR fluid and having an MR piston which slideably engages the cylinder. The MR fluid passes through an orifice/slot of the MR piston. Exposing the MR fluid in the orifice/slot to a varying magnetic field, generated by having a controller provide a varying electric current to a coil of the MR damper (i.e., an electric coil of the MR piston), varies the damping effect of the MR fluid in the orifice/slot providing variably-controlled damping of relative motion between the MR piston and the cylinder. The electric current is varied to accommodate varying operating conditions, as is known to those skilled in the art. A rod has a first end attached to the MR piston and a second end extending outside the cylinder and attached to one of a vehicle frame and a vehicle suspension system component. The cylinder is attached to the other of the vehicle frame and the vehicle suspension system component. The MR damper dampens relative motion of the vehicle frame and the vehicle suspension system component along the direction of piston travel. However, the viscosity (damping effect) of the MR fluid varies with the temperature of the MR fluid. If the temperature of the MR fluid (which can be considered to be the temperature of the coil of the MR damper) could be calculated, then the varying damping effect with temperature of the MR fluid could be compensated for in the electric current provided to the coil by the controller, as is within the level of skill of the artisan.

What is needed is a method for determining the coil temperature of an MR damper of an operating automotive vehicle.

SUMMARY OF THE INVENTION

A first method of the invention is for determining a present coil temperature of a coil of a magnetorheological (MR) damper of an operating automotive vehicle, wherein the coil is powered by an output of a controller connected to the coil through a conductor. The first method includes steps a) through f). Step a) includes calculating that the operating automotive vehicle is in a cold start condition. Step b) includes calculating a cold-start coil-plus-conductor resistance from the voltage and the current of the output of the controller when the controller applies a test current to the coil and the conductor. Step c) includes calculating a conductor resistance by subtracting a cold-start coil resistance, corresponding to a cold-start coil temperature, from the cold-start coil-plus-conductor resistance. Step d) includes calculating a present coil-plus-conductor resistance from the voltage and the current of the controller when the controller applies a test current to the coil and the conductor. Step e) includes calculating a present coil resistance by subtracting the conductor resistance from the present coil-plus-conductor resistance. Step f) includes calculating the present coil temperature using at least the present coil resistance, the cold-start coil resistance, the cold-start coil temperature, and a coefficient of the coil.

A second method of the invention is for determining a coil temperature of a coil of a magnetorheological (MR) damper of an operating automotive vehicle, wherein the coil is powered by a controller connected to the coil through a conductor. The second method includes steps a), b)(1)–(5), and c)(1)–(3). Step a) includes calculating if the operating automotive vehicle is in a cold start condition or a warm start condition. Steps b)(1)–(5) are performed if step a) calculates that the operating automotive vehicle is in a cold start condition. Step b)(1) includes calculating a cold-start coil-plus-conductor resistance from the voltage and the current of the output of the controller when the controller applies a test current to the coil and the conductor. Step b)(2) includes calculating a cold-start conductor resistance by subtracting a cold-start coil resistance, corresponding to a cold-start coil temperature, from the cold-start coil-plus-conductor resistance. Step b)(3) includes calculating a present coil-plus-conductor resistance from the voltage and the current of the controller when the controller applies a test current to the coil and the conductor. Step b)(4) includes calculating a present coil resistance by subtracting the cold-start conductor resistance from the present coil-plus-conductor resistance. Step b)(5) includes calculating the present coil temperature using at least the present coil resistance, the cold-start coil resistance, and the cold-start coil temperature. Steps c)(1)–(3) are performed if step a) calculates that the operating automotive vehicle is in a warm start condition. Step c)(1) includes calculating a present coil-plus-conductor resistance from the voltage and the current of the controller when the controller applies a test current to the coil and the conductor. Step c)(2) includes calculating a present coil resistance by subtracting the cold-start conductor resistance from the present coil-plus-conductor resistance. Step c)(3) includes calculating the present coil temperature using at least the present coil resistance, a warm-start coil resistance, and a warm-start coil temperature.

A third method of the invention is for determining a present coil temperature of a coil of a magnetorheological (MR) damper of an operating automotive vehicle, wherein the coil is powered by an output of a controller connected to the coil through a conductor. The third method includes steps a) through f). Step a) includes obtaining a conductor resistance. Step b) includes obtaining a reference coil temperature. Step c) includes calculating a reference coil-plus-conductor resistance from the voltage and the current of the output of the controller when the controller applies a test current to the coil and the conductor. Step d) includes calculating a reference coil resistance by subtracting the conductor resistance from the reference coil-plus-conductor resistance. Step e) includes calculating a present coil-plus-conductor resistance from the voltage and the current of the controller when the controller applies a test current to the coil and the conductor. Step f) includes calculating a present coil resistance by subtracting the conductor resistance from the present coil-plus-conductor resistance. Step g) includes calculating the present coil temperature using at least the present coil resistance, the reference coil resistance, the reference coil temperature, and a coefficient of the coil.

A fourth method of the invention is for determining a present coil temperature of a coil of a magnetorheological (MR) damper of an operating automotive vehicle, wherein the coil is powered by an output of a controller connected to the coil through a conductor. The fourth method includes steps a) through e). Step a) includes obtaining a reference coil temperature. Step b) includes calculating a reference coil-plus-conductor resistance from the voltage and the current of the output of the controller when the controller applies a test current to the coil and the conductor. Step c) includes obtaining a coefficient of the coil using at least the reference coil-plus-conductor resistance and the reference coil temperature. Step d) includes calculating a present coil-plus-conductor resistance from the voltage and the current of the controller when the controller applies a test current to the coil and the conductor. Step e) includes calculating the present coil temperature using at least the reference coil-plus-conductor resistance, the present coil-plus-conductor resistance, the reference coil temperature, and the coefficient.

A fifth method of the invention is for determining a present coil temperature of a coil of a magnetorheological (MR) damper of an operating automotive vehicle, wherein the coil is powered by an output of a controller connected to the coil through a conductor. The fifth method includes steps a) and b). Step a) includes calculating a coil-plus-conductor resistance from the voltage and the current of the output of the controller when the controller applies a test current to the coil and the conductor. Step b) includes calculating the present coil temperature using at least the coil-plus-conductor resistance and compensating for the resistance of the conductor.

A sixth method of the invention is for determining a coil temperature of a coil of a magnetorheological (MR) damper of an operating automotive vehicle, wherein the coil is powered by an output of a controller connected to the coil through a conductor. The sixth method includes steps a), b)(1)–(3), and c)(1)–(2). Step a) includes calculating if the operating automotive vehicle is in a cold start condition or a warm start condition. Steps b)(1)–(3) are performed if step a) calculates that the operating automotive vehicle is in a cold start condition. Step b)(1) includes calculating a cold-start coil-plus-conductor resistance from the voltage and the current of the output of the controller when the controller applies a test current to the coil and the conductor. Step b)(2) includes calculating a present coil-plus-conductor resistance from the voltage and the current of the controller when the controller applies a test current to the coil and the conductor. Step b)(3) includes calculating a present coil temperature using at least the present coil-plus-conductor resistance, the cold-start coil-plus-conductor resistance, and a cold-start coil temperature. Steps c)(1)–(2) are performed if step a) calculates that the operating automotive vehicle is in a warm start condition. Step c)(1) includes calculating a present coil-plus-conductor resistance from the voltage and the current of the controller when the controller applies a test current to the coil and the conductor. Step c)(2) includes calculating a present coil temperature using at least the present coil-plus-conductor resistance, a warm-start coil resistance, and a warm-start coil temperature.

Several benefits and advantages are derived from one or more of the methods of the invention. Being able to measure the coil temperature of the MR damper allows the varying viscosity (damping effect) with temperature of the MR fluid to be compensated for in the electric current provided by the controller to the coil of the MR damper to correct for overly-stiff damping for cold MR fluid temperatures and overly-soft damping for hot MR-fluid temperatures. Being able to calculate the resistance of the conductor which connects the controller to the coil improves measurement accuracy.

DESCRIPTION OF THE PREFERRED EMBODIMENTS

Figure 1:
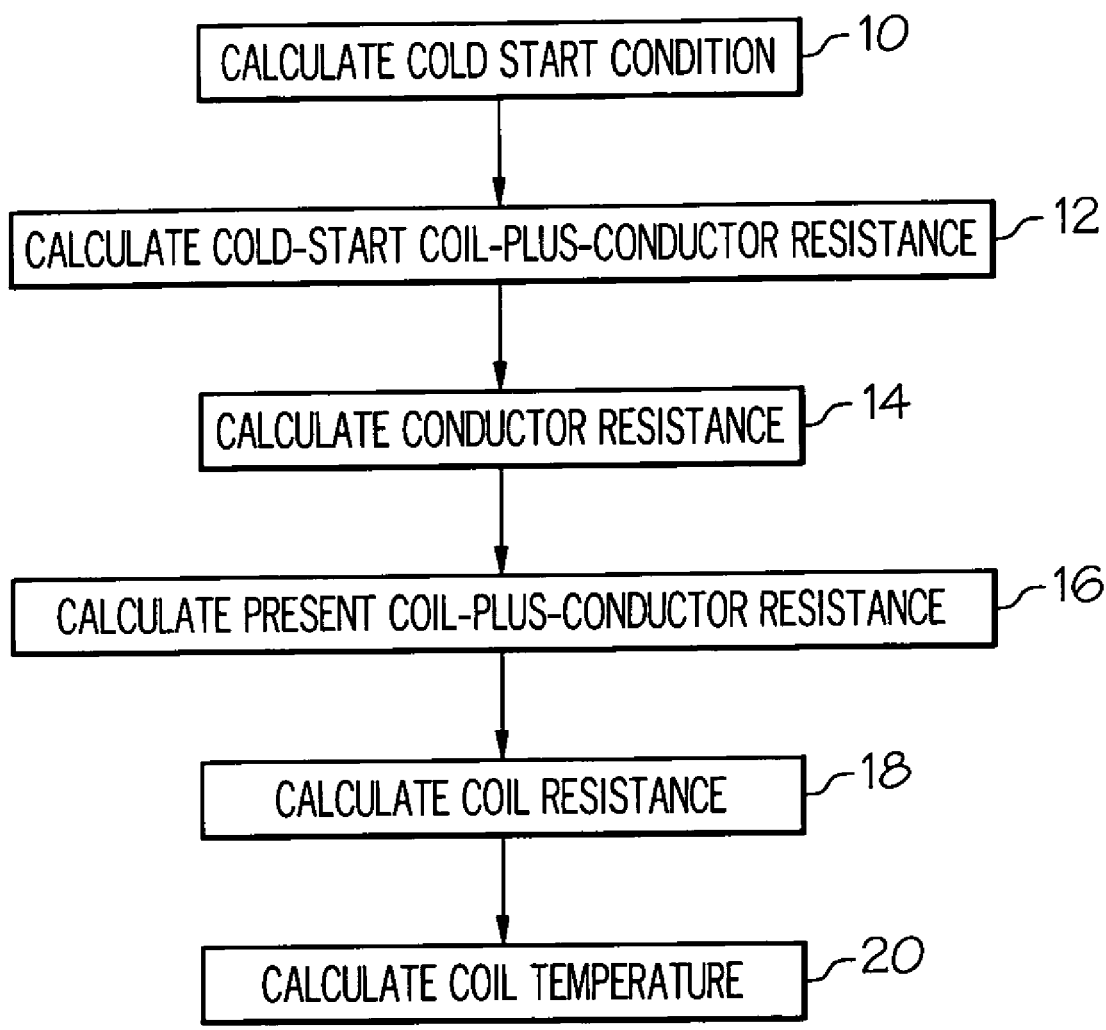
FIG. 1 is a block diagram of a first method of the invention.

A first method of the invention is for determining a present coil temperature of a coil of a magnetorheological (MR) damper of an operating automotive vehicle, wherein the coil is powered by an output of a controller connected to the coil through a conductor. The first method includes steps a) through f). Step a) is labeled as "Calculate Cold Start Condition" in block 10 of FIG. 1. Step a) includes calculating that the operating automotive vehicle is in a cold start condition. Step b) is labeled as "Calculate Cold-Start Coil-Plus-Conductor Resistance" in block 12 of FIG. 1. Step b) includes calculating a cold-start coil-plus-conductor resistance from the voltage and the current of the output of the controller when the controller applies a test current to the coil and the conductor. Step c) is labeled as "Calculate Conductor Resistance" in block 14 of FIG. 1. Step c) includes calculating a conductor resistance by subtracting a cold-start coil resistance, corresponding to a cold-start coil temperature, from the cold-start coil-plus-conductor resistance. Step d) is labeled as "Calculate Present Coil-Plus-Conductor Resistance" in block 16 of FIG. 1. Step d) includes calculating a present coil-plus-conductor resistance from the voltage and the current of the controller when the controller applies a test current to the coil and the conductor. Step e) is labeled as "Calculate Coil Resistance" in block 18 of FIG. 1. Step e) includes calculating a present coil resistance by subtracting the conductor resistance from the present coil-plus-conductor resistance. Step f) is labeled as "Calculate Coil Temperature" in block 20 of FIG. 1. Step f) includes calculating the present coil temperature using at least the present coil resistance, the cold-start coil resistance, the cold-start coil temperature, and a coefficient of the coil.

In one employment of the first method, the cold-start coil-plus-conductor resistance of step b) and the coil-plus-conductor resistance of step d) are calculated by dividing the voltage across the output terminals of the controller by the current at the output terminals of the controller when the controller applies the test current to the coil and the conductor. In the same or a different employment, the present coil temperature of step f) is calculated by adding a temperature increase to the cold-start coil temperature, wherein the temperature increase is a quantity divided by a coefficient, wherein the quantity is a ratio minus one, wherein the ratio is the present coil resistance divided by the cold-start coil resistance, and wherein the coefficient relates the ratio minus one of the resistances of the coil to the temperature change of the coil and is equal to substantially 0.00393 for a copper coil. Other employments (including other coefficients) are left to the artisan, such as those wherein the present coil temperature is calculated from the equation found in U.S. Pat. No. 5,788,028 which uses a different coefficient which relates a resistance change of the coil to a temperature change of the coil.

In one illustration of the first method, the cold-start coil temperature is a room temperature in a manufacturing facility and the cold-start coil resistance is a coil resistance measured in the manufacturing facility. In another illustration, the cold-start coil temperature is a non-coil temperature measured by a temperature sensor on the automotive vehicle and the cold-start coil resistance is calculated from a room temperature in a manufacturing facility, a coil resistance measured in the manufacturing facility, the cold-start coil temperature, and the coefficient of the coil, as is within the level of skill of the artisan. In a further illustration of the first method, the cold-start temperature is derived from ambient air temperature and is derived using at least one temperature sensor on the automotive vehicle, and the cold-start coil resistance is a coil-plus-conductor resistance measured at the time of the cold start.

In one choice of materials employed in the first method, the coil comprises, or consists essentially of, copper. In one construction, the conductor includes a wiring harness. In one variation, the conductor also includes connectors connecting the wiring harness to the controller and to the coil. In one modification, the wiring harness comprises, or consists essentially of, copper. In one deployment, the calculations of the steps of the first method are performed by a computer onboard the vehicle.

In one application of the first method, step a) calculates that the operating automotive vehicle is in a cold start condition using at least an elapsed time since the automotive vehicle was last operating. In one variation, a vehicle system which tracks time and date since the vehicle was last turned off are used. In another variation, a timer since last ignition off is used. In another application, step a) calculates that the operating automotive vehicle is in a cold start condition when the absolute value of the difference between a first temperature measured by a first temperature sensor of the automotive vehicle and a second temperature measured by a second temperature sensor of the automotive vehicle is within a preselected value. In one variation, the first temperature sensor is an engine coolant temperature sensor, and the second temperature sensor is one of an ambient air temperature sensor, a climate control temperature sensor, or an engine air inlet temperature sensor.

In one example of the first method, there is also included repeating steps d) through f) a plurality of times. In one variation, the plurality of times include times the automotive vehicle is traveling below a predetermined speed. In another variation, the plurality of times include times when the time since step f) was last repeated is longer than a preselected time interval. In a further variation, the plurality of times include times when the controller voltage and current for controlling the MR damper are substantially equal to the voltage and the test current of step d). In one modification, the plurality of times do not include times when diagnostics are being run which do not involve the first method of the invention.

In one implementation of the first method, when steps d) through f) are repeated a plurality of times, a coil temperature calculated at time T by repeating step f) is determined to be an invalid coil temperature when the absolute value of the difference between the coil temperatures or coil resistances calculated at time T and at a closest previous time exceeds a predetermined value. In one variation, when a coil temperature of step f) is determined to be an invalid coil temperature, the closest-in time previous coil temperature is used in place of the invalid coil temperature. In another variation, the automotive vehicle has additional MR dampers, and, when a coil temperature of step f) is determined to be an invalid coil temperature, a function of at least one of the coil temperatures of the additional MR dampers of the automotive vehicle is used in place of the invalid coil temperature. In the same or a different implementation, the first method also performs checks to make sure that the current at the output of the controller is within a desired delta or band and that the battery voltage (when used to power the controller) is within a desired delta or band.

In one option of the first method, a low-pass filter is used on the present coil resistance value or the present coil temperature value. In one variation, a valid unfiltered present coil temperature value which departs from the previous coil temperature value is brought closer to the previous coil temperature value by the low-pass filter.

A second method of the invention is for determining a coil temperature of a coil of a magnetorheological (MR) damper of an operating automotive vehicle, wherein the coil is powered by a controller connected to the coil through a conductor. The second method includes steps a), b)(1)–(5), and c)(1)–(3). Step a) includes calculating if the operating automotive vehicle is in a cold start condition or a warm start condition. Steps b)(1)–(5) are performed if step a) calculates that the operating automotive vehicle is in a cold start condition. Step b)(1) includes calculating a cold-start coil-plus-conductor resistance from the voltage and the current of the output of the controller when the controller applies a test current to the coil and the conductor. Step b)(2) includes calculating a cold-start conductor resistance by subtracting a cold-start coil resistance, corresponding to a cold-start coil temperature, from the cold-start coil-plus-conductor resistance. Step b)(3) includes calculating a present coil-plus-conductor resistance from the voltage and the current of the controller when the controller applies a test current to the coil and the conductor. Step b)(4) includes calculating a present coil resistance by subtracting the cold-start conductor resistance from the present coil-plus-conductor resistance. Step b)(5) includes calculating the present coil temperature using at least the present coil resistance, the cold-start coil resistance, and the cold-start coil temperature. Steps c)(1)–(3) are performed if step a) calculates that the operating automotive vehicle is in a warm start condition. Step c)(1) includes calculating a present coil-plus-conductor resistance from the voltage and the current of the controller when the controller applies a test current to the coil and the conductor. Step c)(2) includes calculating a present coil resistance by subtracting the cold-start conductor resistance from the present coil-plus-conductor resistance. Step c)(3) includes calculating the present coil temperature using at least the present coil resistance, a warm-start coil resistance, and a warm-start coil temperature.

In one illustration of the second method, the warm-start coil temperature is the last cold-start coil temperature and the warm-start coil resistance is the last cold-start coil resistance, wherein the last cold-start coil temperature and coil resistance have been stored in a nonvolatile memory of the controller. In one variation, invalid cold-start coil temperatures and resistances are not stored. It is noted that the employments, illustrations, implementations of the first method for the cold-start condition are also applicable to the cold-start and warm-start steps of the second method.

A third method of the invention is for determining a present coil temperature of a coil of a magnetorheological (MR) damper of an operating automotive vehicle, wherein the coil is powered by an output of a controller connected to the coil through a conductor. The third method includes steps a) through g). Step a) includes obtaining a conductor resistance. Step b) includes obtaining a reference coil temperature. Step c) includes calculating a reference coil-plus-conductor resistance from the voltage and the current of the output of the controller when the controller applies a test current to the coil and the conductor. Step d) includes calculating a reference coil resistance by subtracting the conductor resistance from the reference coil-plus-conductor resistance. Step e) includes calculating a present coil-plus-conductor resistance from the voltage and the current of the controller when the controller applies a test current to the coil and the conductor. Step f) includes calculating a present coil resistance by subtracting the conductor resistance from the present coil-plus-conductor resistance. Step g) includes calculating the present coil temperature using at least the present coil resistance, the reference coil resistance, the reference coil temperature, and a coefficient of the coil.

A fourth method of the invention is for determining a present coil temperature of a coil of a magnetorheological (MR) damper of an operating automotive vehicle, wherein the coil is powered by an output of a controller connected to the coil through a conductor. The fourth method includes steps a) through e). Step a) includes obtaining a reference coil temperature. Step b) includes calculating a reference coil-plus-conductor resistance from the voltage and the current of the output of the controller when the controller applies a test current to the coil and the conductor. Step c) includes obtaining a coefficient of the coil using at least the reference coil-plus-conductor resistance and the reference coil temperature. Step d) includes calculating a present coil-plus-conductor resistance from the voltage and the current of the controller when the controller applies a test current to the coil and the conductor. Step e) includes calculating the present coil temperature using at least the reference coil-plus-conductor resistance, the present coil-plus-conductor resistance, the reference coil temperature, and the coefficient.

A fifth method of the invention is for determining a present coil temperature of a coil of a magnetorheological (MR) damper of an operating automotive vehicle, wherein the coil is powered by an output of a controller connected to the coil through a conductor. The fifth method includes steps a) and b). Step a) includes calculating a coil-plus-conductor resistance from the voltage and the current of the output of the controller when the controller applies a test current to the coil and the conductor. Step b) includes calculating the present coil temperature using at least the coil-plus-conductor resistance and compensating for the resistance of the conductor.

A sixth method of the invention is for determining a coil temperature of a coil of a magnetorheological (MR) damper of an operating automotive vehicle, wherein the coil is powered by an output of a controller connected to the coil through a conductor. The sixth method includes steps a), b)(1)–(3), and c)(1)–(2). Step a) includes calculating if the operating automotive vehicle is in a cold start condition or a warm start condition. Steps b)(1)–(3) are performed if step a) calculates that the operating automotive vehicle is in a cold start condition. Step b)(1) includes calculating a cold-start coil-plus-conductor resistance from the voltage and the current of the output of the controller when the controller applies a test current to the coil and the conductor. Step b)(2) includes calculating a present coil-plus-conductor resistance from the voltage and the current of the controller when the controller applies a test current to the coil and the conductor. Step b)(3) includes calculating a present coil temperature using at least the present coil-plus-conductor resistance, the cold-start coil resistance, and a cold-start coil temperature. Steps c)(1)–(2) are performed if step a) calculates that the operating automotive vehicle is in a warm start condition. Step c)(1) includes calculating a present coil-plus-conductor resistance from the voltage and the current of the controller when the controller applies a test current to the coil and the conductor. Step c)(2) includes calculating a present coil temperature using at least the present coil-plus-conductor resistance, a warm-start coil resistance, and a warm-start coil temperature. In one example, the cold and warm start coil-plus-conductor temperature and resistance for the sixth method are calculated as in the illustrations for the first and second methods of the invention with "coil-plus-conductor resistance" replacing "coil resistance", and the present coil temperature of steps b)(3) and c)(2) are calculated as in the employments for the first method with "coil-plus-conductor resistance" replacing "coil resistance" and, for step c)(2), with "warm" replacing "cold".

Several benefits and advantages are derived from one or more of the methods of the invention. Being able to measure the coil temperature of the MR damper allows the varying viscosity (damping effect) with temperature of the MR fluid to be compensated for in the electric current provided by the controller to the coil of the MR damper to correct for overly-stiff damping for cold MR fluid temperatures and overly-soft damping for hot MR-fluid temperatures. Being able to calculate the resistance of the conductor which connects the controller to the coil improves measurement accuracy. Being able to determine that a particular coil temperature is an invalid coil temperature (such as when two consecutive coil temperatures or two consecutive coil resistances are far apart) also improves measurement accuracy.

The foregoing description of several methods of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A method for determining a present coil temperature of a coil of a magnetorheological (MR) damper of an operating automotive vehicle, wherein the coil is powered by an output of a controller connected to the coil through a conductor, and wherein the method comprises the steps of:
   a) calculating that the operating automotive vehicle is in a cold start condition;
   b) calculating a cold-start coil-plus-conductor resistance from the voltage and the current of the output of the controller when the controller applies a test current to the coil and the conductor;
   c) calculating a conductor resistance by subtracting a cold-start coil resistance, corresponding to a cold-start coil temperature, from the cold-start coil-plus-conductor resistance;
   d) calculating a present coil-plus-conductor resistance from the voltage and the current of the controller when the controller applies a test current to the coil and the conductor;
   e) calculating a present coil resistance by subtracting the conductor resistance from the present coil-plus-conductor resistance; and
   f) calculating the present coil temperature using at least the present coil resistance, the cold-start coil resistance, the cold-start coil temperature, and a coefficient of the coil.

2. The method of claim 1, also including repeating steps d) through f) a plurality of times.

3. The method of claim 2, wherein a coil temperature calculated at time T by repeating step f) is determined to be an invalid coil temperature when the absolute value of the difference between the coil temperatures or coil resistances calculated at time T and at a closest previous time exceeds a predetermined value.

4. The method of claim 3, wherein, when a coil temperature of step f) is determined to be an invalid coil temperature, the closest-in-time previous coil temperature is used in place of the invalid coil temperature.

5. The method of claim 3, wherein the automotive vehicle has additional MR dampers, and wherein, when a coil temperature of step f) is determined to be an invalid coil temperature, a function of at least one of the coil temperatures of the additional MR dampers of the automotive vehicle is used in place of the invalid coil temperature.

6. The method of claim 2, wherein the plurality of times include times the automotive vehicle is traveling below a predetermined speed.

7. The method of claim 2, wherein the plurality of times include times when the time since step f) was last repeated is longer than a preselected time interval.

8. The method of claim 2, wherein the plurality of times include times when the controller voltage and current for controlling the MR damper are substantially equal to the voltage and the test current of step d).

9. The method of claim 1, wherein the conductor includes a wiring harness.

10. The method of claim 1, wherein step a) calculates that the operating automotive vehicle is in a cold start condition using at least an elapsed time since the automotive vehicle was last operating.

11. The method of claim 1, wherein step a) calculates that the operating automotive vehicle is in a cold start condition when the absolute value of the difference between a first temperature measured by a first temperature sensor of the automotive vehicle and a second temperature measured by a second temperature sensor of the automotive vehicle is within a preselected value.

12. A method for determining a coil temperature of a coil of a magnetorheological (MR) damper of an operating automotive vehicle, wherein the coil is powered by an output of a controller connected to the coil through a conductor, and wherein the method comprises the steps of:
   a) calculating if the operating automotive vehicle is in a cold start condition or a warm start condition;
   b) if step a) calculates that the operating automotive vehicle is in a cold start condition, then performing the steps of:
      (1) calculating a cold-start coil-plus-conductor resistance from the voltage and the current of the output of the controller when the controller applies a test current to the coil and the conductor;
      (2) calculating a cold-start conductor resistance by subtracting a cold-start coil resistance, corresponding to a cold-start coil temperature, from the cold-start coil-plus-conductor resistance;
      (3) calculating a present coil-plus-conductor resistance from the voltage and the current of the controller when the controller applies a test current to the coil and the conductor;
      (4) calculating a present coil resistance by subtracting the cold-start conductor resistance from the present coil-plus-conductor resistance; and
      (5) calculating a present coil temperature using at least the present coil resistance, the cold-start coil resistance, and the cold-start coil temperature; and
   c) if step a) calculates that the operating automotive vehicle is in a warm start condition, then performing the steps of:
      (1) calculating a present coil-plus-conductor resistance from the voltage and the current of the controller when the controller applies a test current to the coil and the conductor;
      (2) calculating a present coil resistance by subtracting the cold-start conductor resistance from the present coil-plus-conductor resistance; and
      (3) calculating a present coil temperature using at least the present coil resistance, a warm-start coil resistance, and a warm-start coil temperature.

13. The method of claim 12, also including, if step a) calculates that the operating automotive vehicle is in a cold start condition, repeating steps b)(3) through b)(5) a plurality of times, and, if step a) calculates that the operating automotive vehicle is in a warm start condition, repeating steps c)(1) through c)(3) a plurality of times.

14. The method of claim 13, wherein a coil temperature calculated at time T by repeating a coil temperature calculation step is determined to be an invalid coil temperature when the absolute value of the difference between the coil temperatures or coil resistances calculated at time T and at a closest previous time exceeds a predetermined value.

15. The method of claim 14, wherein, when a coil temperature is determined to be an invalid coil temperature, the closest previous coil temperature is used in place of the invalid coil temperature.

16. The method of claim 14, wherein the automotive vehicle has additional MR dampers, and wherein, when a coil temperature is determined to be an invalid coil temperature, a function of at least one of the coil temperatures of the additional MR dampers of the automotive vehicle is used in place of the invalid coil temperature.

17. The method of claim 13, wherein the plurality of times include times the automotive vehicle is traveling below a predetermined speed.

18. The method of claim 13, the plurality of times include times when the time since step b)(5) was last repeated, if step a) calculated a cold start condition, or include times when the time since step c)(3) was last repeated, if step a) calculated a warm start condition, is longer than a preselected time interval.

19. The method of claim 13, wherein the plurality of times include times when the controller voltage and current for controlling the MR damper are substantially equal to the voltage and the test current of step b)(3) if step a) calculated a cold start condition or are substantially equal to the voltage and the test current of step c)(1) if step a) calculated a warm start condition.

20. The method of claim 12, wherein the conductor includes a wiring harness.

21. The method of claim 12, wherein step a) calculates if the operating automotive vehicle is in the cold start condition or the warm start condition using at least an elapsed time since the automotive vehicle was last operating.

22. The method of claim 12, wherein step a) calculates if the operating automotive vehicle is in a cold start condition or a warm start condition using at least if the absolute value of the difference between a first temperature measured by a first temperature sensor of the automotive vehicle and a second temperature measured by a second temperature sensor of the automotive vehicle is within a preselected value.

23. A method for determining a present coil temperature of a coil of a magnetorheological (MR) damper of an operating automotive vehicle, wherein the coil is powered by an output of a controller connected to the coil through a conductor, and wherein the method comprises the steps of:
   a) obtaining a conductor resistance;
   b) obtaining a reference coil temperature;
   c) calculating a reference coil-plus-conductor resistance from the voltage and the current of the output of the controller when the controller applies a test current to the coil and the conductor;

d) calculating a reference coil resistance by subtracting the conductor resistance from the reference coil-plus-conductor resistance e) calculating a present coil-plus-conductor resistance from the voltage and the current of the controller when the controller applies a test current to the coil and the conductor;

f) calculating a present coil resistance by subtracting the conductor resistance from the present coil-plus-conductor resistance; and g) calculating the present coil temperature using at least the present coil resistance, the reference coil resistance, the reference coil temperature, and a coefficient of the coil.

24. A method for determining a present coil temperature of a coil of a magnetorheological (MR) damper of an operating automotive vehicle, wherein the coil is powered by an output of a controller connected to the coil through a conductor, and wherein the method comprises the steps of:

a) obtaining a reference coil temperature;

b) calculating a reference coil-plus-conductor resistance from the voltage and the current of the output of the controller when the controller applies a test current to the coil and the conductor;

c) obtaining a coefficient of the coil using at least the reference coil-plus-conductor resistance and the reference coil temperature;

d) calculating a present coil-plus-conductor resistance from the voltage and the current of the controller when the controller applies a test current to the coil and the conductor; and e) calculating the present coil temperature using at least the reference coil-plus-conductor resistance, the present coil-plus-conductor resistance, the reference coil temperature, and the coefficient.

25. A method for determining a coil temperature of a coil of a magnetorheological (MR) damper of an operating automotive vehicle, wherein the coil is powered by an output of a controller connected to the coil through a conductor, and wherein the method comprises the steps of:

a) calculating if the operating automotive vehicle is in a cold start condition or a warm start condition;

b) if step a) calculates that the operating automotive vehicle is in a cold start condition, then performing the steps of:

(1) calculating a cold-start coil-plus-conductor resistance from the voltage and the current of the output of the controller when the controller applies a test current to the coil and the conductor;

(2) calculating a present coil-plus-conductor resistance from the voltage and the current of the controller when the controller applies a test current to the coil and the conductor; and (3) calculating a present coil temperature using at least the present coil-plus-conductor resistance, the cold-start coil-plus-conductor resistance, and a cold-start coil temperature; and c) if step a) calculates that the operating automotive vehicle is in a warm start condition, then performing the steps of:

(1) calculating a present coil-plus-conductor resistance from the voltage and the current of the controller when the controller applies a test current to the coil and the conductor; and (2) calculating a present coil temperature using at least the present coil-plus-conductor resistance, a warm-start coil-plus-conductor resistance, and a warm-start coil temperature.

26. The method of claim 25, also including, if step a) calculates that the operating automotive vehicle is in a cold start condition, repeating steps b)(1) through b)(3) a plurality of times, and, if step a) calculates that the operating automotive vehicle is in a warm start condition, repeating steps c)(1) through c)(2) a plurality of times.

27. The method of claim 26, wherein a coil temperature calculated at time T by repeating a coil temperature calculation step is determined to be an invalid coil temperature when the absolute value of the difference between the coil temperatures or coil resistances calculated at time T and at a closest previous time exceeds a predetermined value.

28. The method of claim 27, wherein, when a coil temperature is determined to be an invalid coil temperature, the closest previous coil temperature is used in place of the invalid coil temperature.

29. The method of claim 27, wherein the automotive vehicle has additional MR dampers, and wherein, when a coil temperature is determined to be an invalid coil temperature, a function of at least one of the coil temperatures of the additional MR dampers of the automotive vehicle is used in place of the invalid coil temperature.

30. The method of claim 26, wherein the plurality of times include times the automotive vehicle is traveling below a predetermined speed.

31. The method of claim 26, the plurality of times include times when the time since step b)(3) was last repeated, if step a) calculated a cold start condition, or include times when the time since step c)(2) was last repeated, if step a) calculated a warm start condition, is longer than a preselected time interval.

32. The method of claim 26, wherein the plurality of times include times when the controller voltage and current for controlling the MR damper are substantially equal to the voltage and the test current of step b)(1) if step a) calculated a cold start condition or are substantially equal to the voltage and the test current of step c)(1) if step a) calculated a warm start condition.

33. The method of claim 25, wherein the conductor includes a wiring harness.

34. The method of claim 25, wherein step a) calculates if the operating automotive vehicle is in the cold start condition or the warm start condition using at least an elapsed time since the automotive vehicle was last operating.

35. The method of claim 25, wherein step a) calculates if the operating automotive vehicle is in a cold start condition or a warm start condition using at least if the absolute value of the difference between a first temperature measured by a first temperature sensor of the automotive vehicle and a second temperature measured by a second temperature sensor of the automotive vehicle is within a preselected value.

* * * * *